United States Patent [19]
Zusman et al.

[11] Patent Number: 6,119,467
[45] Date of Patent: Sep. 19, 2000

[54] METHOD AND INSTALLATION FOR CONTINUOUS PRODUCTION OF WHIPPED ICE

[75] Inventors: Vladimir Zusman; Yuri Kayem; Boris Menin, all of Beer Sheva, Israel

[73] Assignee: Brontec U.S.A., Inc., Gilford, N.H.

[21] Appl. No.: 08/974,833

[22] Filed: Nov. 20, 1997

(Under 37 CFR 1.47)

[51] Int. Cl.⁷ ...................................................... A23G 9/20
[52] U.S. Cl. .................................. 62/69; 62/113; 62/513
[58] Field of Search .................................. 62/68, 69, 113, 62/342, 513

[56] References Cited

U.S. PATENT DOCUMENTS

| | | | |
|---|---|---|---|
| 2,946,205 | 7/1960 | Wakeman | 62/304 |
| 3,142,971 | 8/1964 | Morgan, Jr. et al. | 62/342 |
| 4,706,473 | 11/1987 | Cipelletti | 62/342 |

*Primary Examiner*—William E. Tapolcai
*Attorney, Agent, or Firm*—Kenyon & Kenyon

[57] ABSTRACT

An installation is described for continuous production of whipped ice from a below-zero crystallization temperature solution, including methods for delivering solution and gas through the evaporator; a closed refrigeration circuit for the realization of cooling and three-dimensional (volume) crystallization of ice within the gas-solution flowing through the evaporator. These processes cause the formation within the evaporator unit(s) of a partly frozen foam with ice nuclei and gas bubbles occupying a space and a continuous phase consisting of concentrated, unfrozen liquor; preparation means is described for transportation and further storage or use of whipped ice. A method for continuous production of whipped ice is also described.

15 Claims, 3 Drawing Sheets

METHOD AND INSTALLATION FOR CONTINUOUS PRODUCTION OF WHIPPED ICE

BACKGROUND OF THE INVENTION

The present invention relates to a method and installation for the continuous production of whipped ice.

A liquid ice-making machine and method, as seen in U.S. Pat. No. 5,383,342, shows that a solution, passing through at least one tubular element, is cooled by direct contact with a cooling surface (ice crystal nuclei moved from said inside surface throughout the entire volume of said tubular element). An ice separator continuously discharges ice crystals separated from a mixture of concentrated solution and ice crystals from the tubular element.

However, the method according to the above patent, can be disadvantageous if clogging along the entire tubular element volume arises. Ice crystals are removed from a cooling surface by teflon cutting blades. The cutting blades revolve on their shaft at a high revolution rate per minute causing a mass of solution to be forced from the shaft in all directions to the cooling surface. The ice crystals, in turn, speed to the axis of the tubular element, due to the existing difference between densities of ice and solution. New portions of ice continuously press and envelop the revolving shaft. At the same time, the flow rate of ice withdrawing from the volume of the tubular element is dependent on only one factor, i.e., the flow rate of the solution. In the case of a vertical evaporator, there is an additional factor—gravitational (buoyancy) force. If the flow rate of the ice mass leaving the evaporator is low, then the above mentioned clogging process is dramatically accelerated. This clogging causes a severe increase of the shaft motor's torque demands (measured as current) and the liquid ice production process is stopped. Increasing the flow rate of the solution causes insufficient sub-cooling of the solution in the volume of the evaporator, thereby causing the liquid ice production to be decreased.

A further serious disadvantage of the above mentioned method is the fact that in order to scrape away ice nuclei from an insufficient polished cooling surface, the strength of wipers must be strong enough to survive full contact between the blades and the cooling surface along the evaporator's axis. Because the blades are made from teflon or similar plastics, which are very soft materials, the thickness of crystal "wall" ice, which is frozen to the cooling surface, is not scraped away after every new revolution of the blades. This causes a sharp decrease of heat transfer between the solution and the refrigerant. Besides the increased insulation, the pressing of the blades against a thickening ice layer is quite deleterious. As a result, the shaft motor current is increased and the liquid ice process is stopped. The blades used for ice nuclei cutting and moving from the cooling surface are blunted.

SUMMARY OF THE INVENTION

One of the objects of the present invention is to overcome the drawbacks and disadvantages of the previous method and to provide a method and installation for the production of a "whipped" ice which is stable, continuous, consumes less energy, allows transportation of whipped ice for long distances, is less demanding (as to the close adherence to predetermined parameters), and maintains all essential operational parameters.

According to the invention, this is achieved by providing a method for continuous whipped ice production comprising the following steps: passing below-zero cryoscopic temperature solution through the evaporator, passing gas through the evaporator; cooling down of the solution layer adjacent to the evaporator's inside surface and production of ice nuclei adhering to the inside surface of the evaporator's wall, the outer surface of which is in direct thermal contact with a boiling refrigerant in an evaporator and, across which, heat transfer between solution and refrigerant is realized; sub-cooling the liquid refrigerant before boiling; superheating the refrigerant's vapors; destroying refrigerant's foam into the regenerative heat exchanger—liquid separator; returning non-vaporized liquid freon straight to the boiling cavity of the evaporator; applying means to remove said ice nuclei from said inside surface and to whip gas bubbles and wall—adjacent cooled down solution layer with ice nuclei substantially uniformly throughout the entire volume of said evaporator to promote three dimensional formation of fine ice nuclei throughout said volume and to intensify this process; moving whipped ice that has compressed against the evaporator axis, and removing mixture of frozen foam with ice nuclei and gas bubbles occupying a space and a continuous phase consisting of concentrated, un-frozen liquor from said evaporator; transporting said mixture for storage for further use.

The invention further provides a method for continuous production of whipped ice, comprising the steps of providing an emulsion of a predetermined chemical and physical parameters from the below-zero cryoscopic temperature solution and gas used as the conveyor working medium; withdrawing said emulsion from the providing equipment and passing it through the evaporator; cooling of the emulsion layer adjacent to the inside evaporator's surface and production of frozen foam with ice nuclei adhering to the inside surface of evaporator's wall, the outer surface of which is in direct thermal contact with a refrigerant boiling in a bubble regime at the evaporator and across which heat transfer between emulsion and refrigerant is realized: sub-cooling the liquid refrigerant before boiling; superheating the refrigerant's vapors; destroying refrigerant's foam into the regenerative heat exchanger—liquid separator; returning non-vaporized liquid freon directly to the boiling cavity of the evaporator; applying means to remove said frozen foam with ice nuclei from said inside cooling surface and to ship said frozen emulsion substantially uniformly throughout the entire volume of said evaporator with, continuously cooling down part of emulsion flow, which is not attached to the said cooling surface, to promote three dimensional formation of fine ice nuclei and to whip gas bubbles and concentrated solution throughout said volume and to intensify this process; carrying out, compressed to evaporator's axis, whipped ice and removing mixing of frozen foam with ice nuclei and gas bubbles occupying some space and continuous phase consisting of concentrated, unfrozen liquor from said evaporator by projectile's regime of gas motion along evaporator; transporting said whipped ice with concentrated solution for storage or further use.

In addition, the invention provides an installation for continuous production of whipped ice from a solution and gas, comprising pump means for propelling solution from a supply system into evaporator; compressor, storage and delivering means for passing gas through said evaporator with a bubble regime boiling refrigerant by side of refrigerant; a refrigeration circuit for cooling down solution passing through said evaporator, causing the formation therein of ice nuclei; a liquid separator—regenerative heat exchanger mounted above the said evaporator; conduit means interconnecting said liquid separator and said evaporator; oil returning means inter-connecting said evaporator and compressor's crankcase; withdrawing means for delivering said whipped ice with concentrated solution from an evaporator to the storage place or for further use.

The invention still further provides an installation for continuous production of whipped ice from an emulsion of a predetermined chemical and physical parameters from the below-zero cryoscopic temperature solution and gas used as the conveyor working medium, comprising a providing means for preparation of said emulsion, including solution supply system, compressor and storage means for gas, emulsifier; pump means for propelling emulsion from said emulsifier into evaporator with a bubble regime boiling refrigerant by the side of refrigerant; a refrigeration circuit for cooling down emulsion passing through said evaporator, causing the formation therein of frozen foam with ice nuclei and, unfrozen, concentrated solution; a liquid separator— regenerative heat exchanger mounted above said evaporator; conduit passages interconnecting said liquid separator and said evaporator; oil returning means interconnecting said evaporator and compressor's crank-case; withdrawing means for delivering said whipped ice with concentrated, unfrozen solutions from an evaporator to the storage place, or for the further use by a "projectile" regime of gas motion along the evaporator and transportation tubes.

BRIEF DESCRIPTION OF THE DRAWINGS

To fully understand the invention, it will now be described in connection with certain preferred embodiments with reference to the following illustrative figures so that it may be more fully understood.

In the drawings.

DETAILED DESCRIPTION

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, the description taken with the drawings makes apparent to those skilled in the art how the several forms of the invention may be embodied in practice.

To facilitate understanding of the following, it will be appreciated that the method and installation, according to the invention, use different working fluids which, as described below, are given the following designations, which apply also to the conduits carrying these fluids:

| Solution at a predetermined parameter | B |
|---|---|
| Air | A |
| Solution + Air | B + A |
| Emulsion | E |
| Refrigerant, liquid | $R_L$ |
| Refrigerant, vaporous | $R_V$ |

-continued

| Mixture of $R_L$ and $R_V$ | $R_{L+V}$ |
|---|---|
| Whipped ice with concentrated solution | WI |
| Water | W |
| Oil | O |

It should be further noted that the term "solution", as used herein, refers to a below-zero cryoscopic temperature liquid in which the solvent is water and the solute is any substance suitable for the intended purpose. In the method according to the invention, the solute may advantageously be common salt. This, together with water, forms a solution commonly known as "brine". Another possibility would be to use a solution based on glycol or beer, any juice, wine, sea water, or milk.

Figure 2:
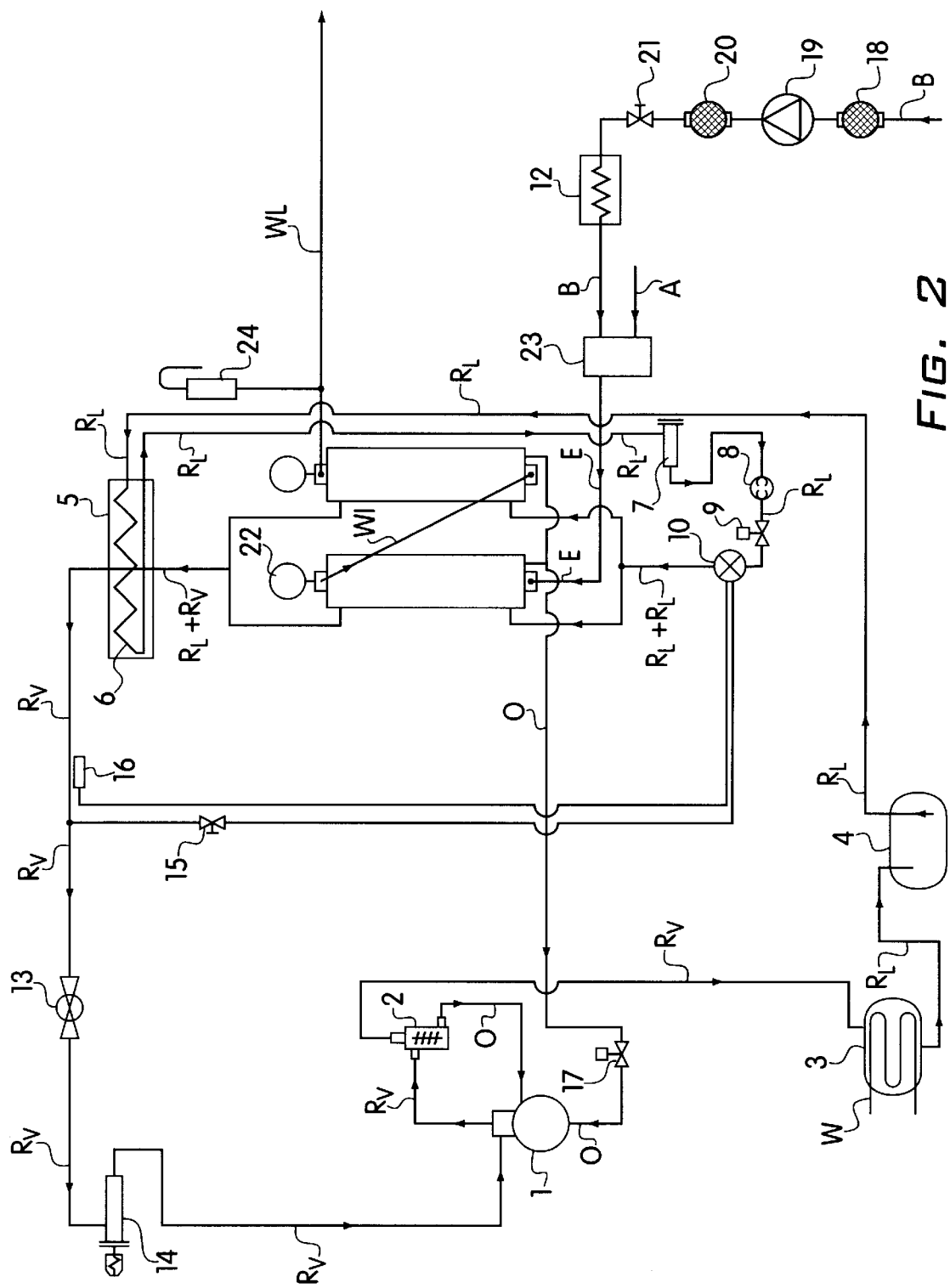
FIG. 2 is a general layout and flow diagram of a second embodiment of the installation according to the invention.

Referring now to the drawings, there are seen in the schematic layout of FIG. 2 tube-in-tube vertical evaporators 11, a liquid separator-regenerative heat exchanger 5 located above the evaporators, a compressor 1, an oil separator 2, a suction filter 14, a pressure regulation valve 13, a condenser 3 in which the refrigerant vapor $R_V$ is referred to the liquid state $R_L$, a receiver vessel 4 from which the liquid refrigerant $R_L$ is supplied to the evaporators 11 through a filter-dryer 7, sight glass 8, solenoid valve 9, thermal expansion valve 10 with balloon 16 and balance line including check valve 15. The solution B is passed by pump 19. In order to keep the solution at a temperature close to its cryoscopic point it is advantageous to pre-cool it, prior to its introduction into the first evaporator 11.

Figure 1:
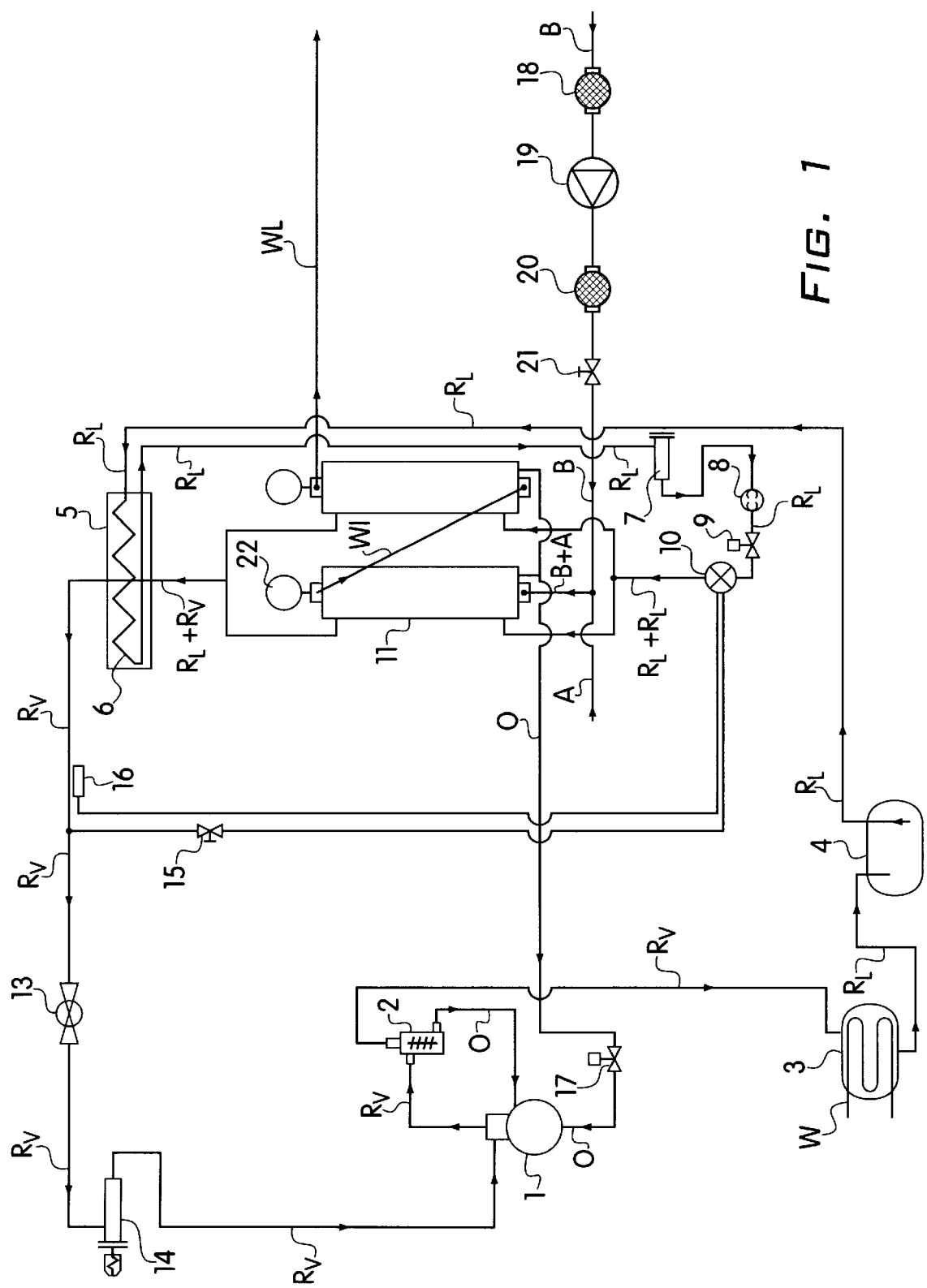
FIG. 1 is a general layout and flow diagram of a first embodiment of an installation according to the invention.

The installation according to the invention as schematically illustrated in FIG. 1 is seen to comprise two separate, but thermally interacting circuits, a solution circuit and a refrigerant circuit.

The solution circuit is simply and includes pump 19, a coarse filter 18, a line filter 20, a check valve 21, solution cavities of evaporators 11, motors 22 with revolving shafts and knives.

The per se largely known refrigerant circuit includes a receiver vessel 4 in which the liquid refrigerant $R_L$ coming from condenser 3 collects, a first pass through the liquid separator—regenerative heat exchanger 5, a filter-dryer 7, a sight-glass 8, a thermal expansion valve 10, the boiling cavity of the evaporators 11; into the liquid separator-regenerative heat exchanger, the refrigerant arrives as a liquid/vapor mixture $R_{L+V}$ in the form of bubbles foam destroyed by contact with the high temperature outside surfaces of liquid refrigerant coil 6 for two components. The vapor component $R_V$ aspirated by the compressor 1, is forced via a suction filter 14 and an oil separator 2 into the condenser 3. The liquid refrigerant $R_L$ yielded in the liquid separator-heat exchanger 5 is returned to the boiling cavity of the evaporators 11. In the above first pass through the liquid separator-regenerative heat exchanger 5, the relatively cold refrigerant vapor $R_V$ absorbs heat from the liquid refrigerant $R_L$ and is thus superheated, while the liquid refrigerant $R_L$ is sub-cooled. Sub-cooling of $R_L$ upstream of the thermal expansion valve 10 is advantageous, as it reduces throttling losses, thus increasing the specific cold capacity of the refrigerant.

A further development of the invention, schematically illustrated in FIG. 2 utilizes the effects on the solution of strong mixing of solution and gas to get an emulsion before its cooling down and freezing.

Preliminary emulsifying of the solution cooled in an independent chilling unit 12 (production of dispersed phase)

before entrance to the evaporator 11, promotes increase of dispersed phase heat transfer surface of the solution, increases a film coefficient between cooling surface and emulsion, intensifies three-dimensional ice nuclei formation into the evaporator, prevents the clogging of the through-passage of evaporators cross-section and accelerates carrying out frozen foam with ice nuclei and gas bubbles and concentrated, unfrozen liquid. In addition, the specific power expenditure for removing frozen foam with ice nuclei from cooling surfaces is sharply decreased (by a factor or more than two). The produced ice has a smooth and whipped texture.

FIG. 2 shows an emulsifier 23 for a pair of evaporators assembled by connecting the solution sides in series.

Figure 3:
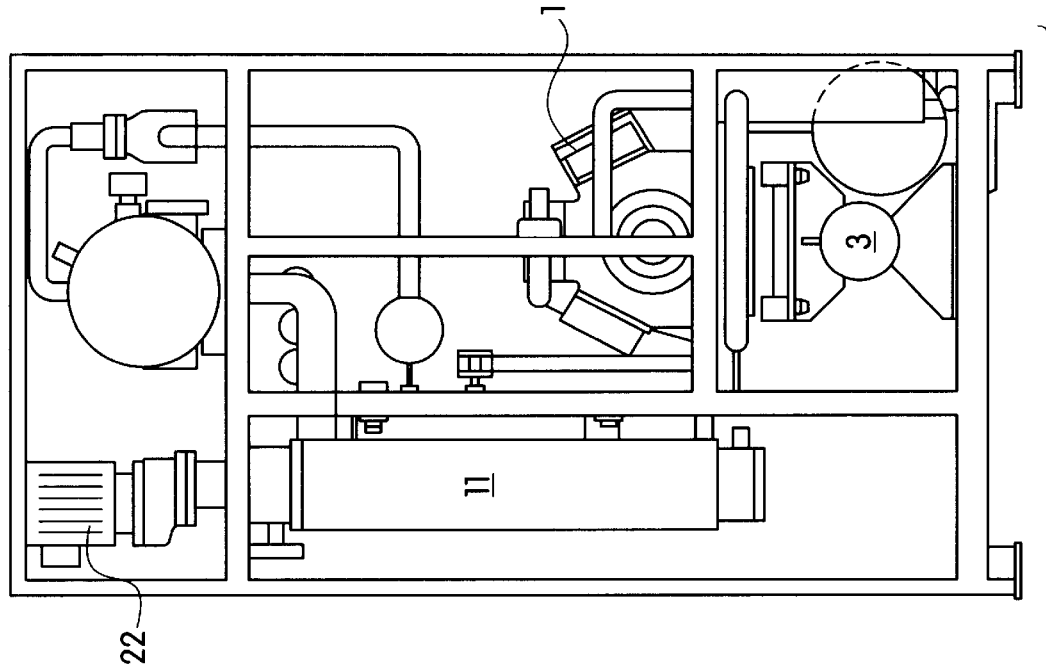
FIG. 3 is a common assembling view of a whipped ice machine with four evaporators connected in series by solution side.
Figure 3:
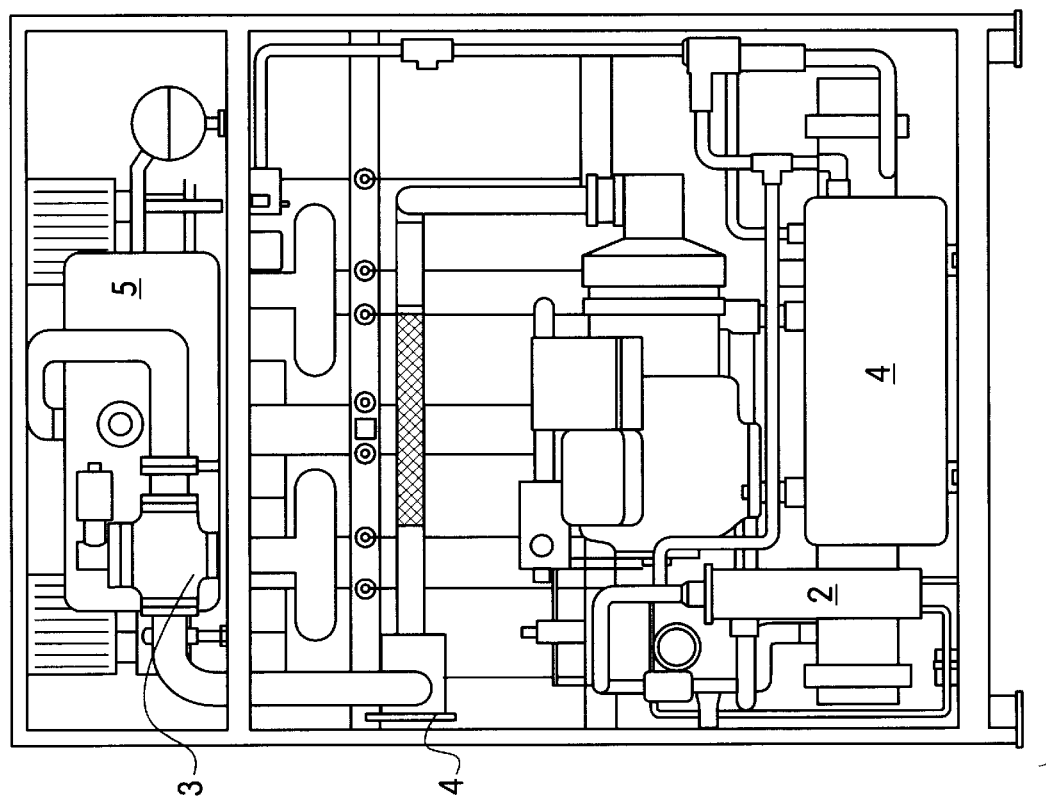

A first embodiment of the practical realization of the whipped ice making machine according to the invention is illustrated in FIG. 3.

Four assembled vertical evaporators 11 are sent connected on the solution side in series and on the refrigerant side in parallel with one liquid separator-regenerative heat exchanger 5. Simultaneous and combined usage of the above-mentioned developments illustrated in FIG. 1 or FIG. 2 and realized in FIG. 3 promotes very satisfactory energy expenditure per one metric ton of whipped ice which may equal 35 to 40 kWH compared to 60 to 110 kWH for flake ice production.

In order to support a continuous, stable and high-efficiency process of whipped ice production, one must have an inner surface roughness of 0.5 micron $R_2$. With that smoothness the adhesive force between the inner wall surface of the evaporator and ice nuclei, forming on said surface will be so low that plastic wipers are enough to remove ice nuclei or frozen foam with ice nuclei from cooling surface.

Low gas flow rate doesn't prevent the clogging of entire the volume of an evaporator tube. Increase of gas flow rate causes higher concentration of bubbles in the specific volume of mixture and promotes intensification of three-dimensional formation of ice nuclei and easy transportation of whipped ice along the evaporator and through pipes. But if the gas flow is too great drainage of the whipped ice mass occurs within the evaporator, and the dried-out mass causes stopping of rotor's motor because of the current increase. Reasonable gas flow rates equal 0.5 to 2.0 l/min per $cm^2$ of the evaporator cross-section area. This flow rate is right for materials widely used for the evaporator, e.g., stainless steel, aluminum alloys.

In order to keep a constant maximum film coefficient on the refrigerant side along all heat transfer surfaces, the refrigerant must boil within the evaporators' walls. This produces a bubble of refrigerant vapor which starts restricted motion upward under the effect of gravitational (buoyancy) forces. The moving bubble functions as a piston pushing upward on the refrigerant. Approaching the evaporator manifold the bubbles with part of liquid refrigerant go out from said evaporator, climb to said liquid separator, are destroyed by touching with the high temperature surface of liquid refrigerant coil and the entrained liquid refrigerant is thrown down into the space between two heat transfer surfaces of evaporator walls. For the most commonly used refrigerants (ammonia, freon 22, freon 502, freon 404A) when the clearance between two walls is less than 5 mm (a diameter of refrigerant bubble at the moment of its breaking off from the heat exchanging surface at the pressure which equals 30% of the critical pressure of refrigerant) the liquid refrigerant enters between two heat transfer walls in insufficient quantities and there develops large spaces containing vaporized refrigerant which reduces the duration of heat exchange between the "projectile regime" boiled refrigerant and said surfaces with a reduction of the heat transfer coefficient between refrigerant and solution. If the clearance exceeds 23 mm a large amount of refrigerant is circulated into refrigerant system, and significant amount of refrigerant doesn't have time to absorb heat load from the solution side across the heat transfer wall. This causes an undesirable increase of heat load for the compressor and accordingly growth of specific energy expenditure per one ton of ice production.

Apart from the stated object of this invention, it can also be used in connection with fish and poultry processing, cooling of supermarket counters, pharmaceutics, waste water treatment, for desalination of sea water, for concentration of liquid solution and suspensions, such as juice, beer, wine, etc., in air-conditioning, and the storage of perishables.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for continuous production of whipped ice, comprising of the following steps:

providing a solution of a predetermined chemical and physical composition, having below-zero cryoscopic temperature;

delivering the provided solution to a place of cooling down and freezing treatment;

passing below-zero cryoscopic temperature solution through an evaporator;

passing compressed gas through the evaporator in order to improve the process;

cooling down of the solution layer adjacent to an inside evaporator's surface, producing ice nuclei adhering to the inside surface of the evaporator's wall the outer surface of which is in direct thermal contact with a boiling refrigerant in an evaporator and across which heat transfer between said solution and a refrigerant is realized;

providing refrigerant boiling to produce refrigerant vapors;

sub-cooling the liquid refrigerant before boiling, super-heating the refrigerant vapors, destroying refrigerant bubble foam that has penetrated into a liquid separator-regenerative heat exchanger, including a liquid refrigerant coil, by contact with high temperature outside surfaces of the coil, returning non-vaporized liquid refrigerant straight to a boiling cavity of said evaporator;

applying means to remove said ice nuclei from said inside surface and to whip gas bubbles and wall adjacent cooled down solution layer with ice nuclei substantially uniformly throughout the entire volume of said evaporator to promote three dimensional formation of fine ice nuclei throughout said volume to intensify this process;

moving away whipped ice that has compressed against the evaporator axis and removing a mixture of frozen foam with ice nuclei and gas bubbles and concentrated, unfrozen solution from said evaporator; and transporting the mixture to storage or further utilization, wherein roughness of the evaporator inside surface, which is in contact with cooled and frozen medium, is less than 1 micron.

2. A method for continuous production of whipped ice, comprising the following steps:

providing a solution of a predetermined chemical and physical composition having below zero cryoscopic temperature;

providing a compressed gas of a predetermined chemical and physical composition;

passing the compressed gas to an emulsifier;

providing an emulsion of predetermined chemical and physical parameters from a below-zero cryoscopic temperature solution and previously compressed gas;

delivering the provided emulsion from the creation site to a place of cooling down and freezing treatment;

passing said emulsion through an evaporator;

cooling down of the emulsion layer adjacent to the inside evaporator surface and producing frozen foam with ice nuclei adhering to the inside surface of said evaporator wall, the outer surface of which is in direct thermal contact with a refrigerant boiling in a bubble regime at said evaporator and across which heat transfer between said emulsion and a refrigerant is realized;

providing refrigerant boiling to produce refrigerant vapors;

sub-cooling the liquid refrigerant in a regenerative heat exchanger before boiling, superheating the refrigerant vapors, destroying refrigerant bubble foam penetrated to a liquid separator—regenerative heat exchanger, including a liquid refrigerant coil, by contact with high temperature outside surfaces of the coil;

returning non-vaporized liquid refrigerant straight to a boiling cavity of said evaporator;

applying means to remove said frozen foam with ice nuclei from said inside cooling surface and to whip said frozen emulsion substantially uniformly throughout the entire volume of said evaporator with, continuously cooled down, part of emulsion flow which is not contacted with said cooling surface to promote three dimensional formation of fine ice nuclei and to whip gas bubbles and concentrated solution throughout said volume and to intensify this process;

moving away whipped ice that has compressed against the evaporator axis and removing a mixture of frozen foam with ice nuclei and gas bubbles and concentrated unfrozen solution from said evaporator;

transportation of said whipped ice with concentrated solution for storage or further utilization, wherein roughness of the evaporator inside surface, which is in contact with cooled and frozen medium, is less than 1 micron.

3. The method as claimed in claim 1 or 2, wherein gas flow rates equal 0.5 to 2.0 l/min per $cm^2$ of the evaporator cross-section area with maximum value of gas pressure 4 bar.

4. The method as claimed in claim 1 or 2, wherein prepared solution is passed into the evaporator through filtering means at a level which is less than 5 micron.

5. The method as claimed in claim 1 or 2, wherein prepared compressed gas is put to the filtration at a level which is less than 5 micron.

6. The method as claimed in claim 1 or 2, wherein prepared solution is passed into the evaporator through independent pre-cooling means in order to cool it to its cryoscopic temperature.

7. The method as claimed in claim 1 or 2, wherein prepared compressed gas is not only a conveyor working medium but also an additional supply of cold in order to intensify three dimensional formation of ice nuclei into said evaporator.

8. The method as claimed in claim 1 or 2, comprising the further step of separating said whipped ice from gas bubbles downstream of the evaporator.

9. The method as claimed in claim 1 or 2, wherein the solution is brine.

10. The method as claimed in claim 1 or 2, wherein the solution is based on a liquid selected from the group consisting of glycol, beer, juice, wine, sea water and milk.

11. The method as claimed in claim 1 or 2, wherein the liquid refrigerant is sub-cooled upstream of a thermal expansion valve.

12. The method as claimed in claim 1 or 2 wherein the roughness is 0.5 micron.

13. The method as claimed in claim 1 or 2 wherein a clearance between two heat transfer surfaces of said evaporator intended for a bubble foam refrigerant is between 5 mm and 23 mm.

14. The method as claimed in claim 1 or 2 wherein the refrigerant is freon.

15. The method as claimed in claim 1 or 2 wherein the refrigerant is ammonia.

* * * * *